Figure 11:
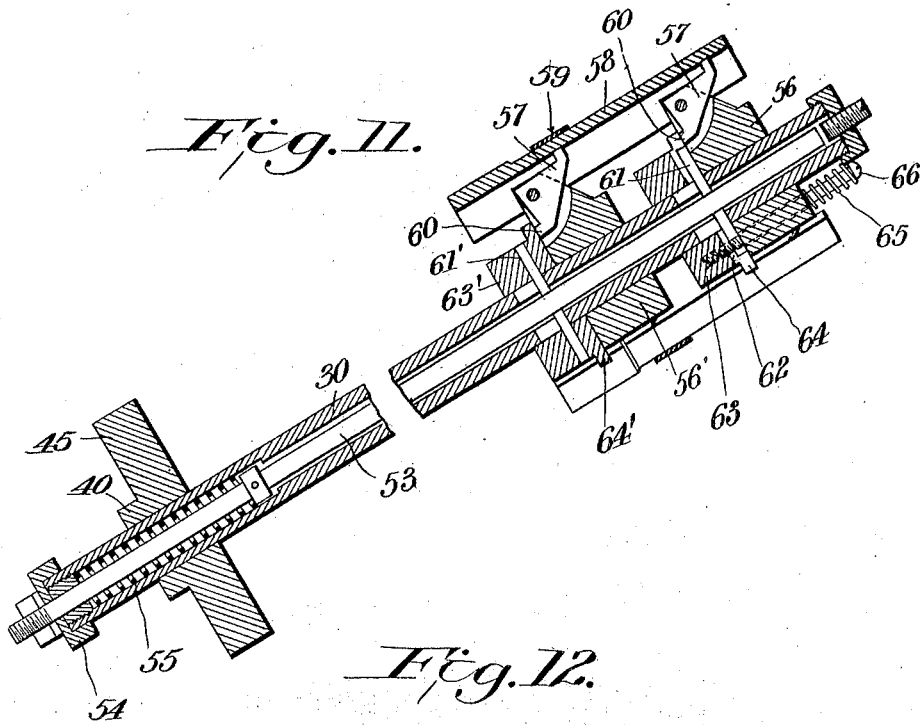

J. A. MILLIKEN.
GLASS CUTTING MACHINE.
APPLICATION FILED AUG. 21, 1916. RENEWED MAR. 25, 1921.
1,402,457.
Patented Jan. 3, 1922.
8 SHEETS—SHEET 1.
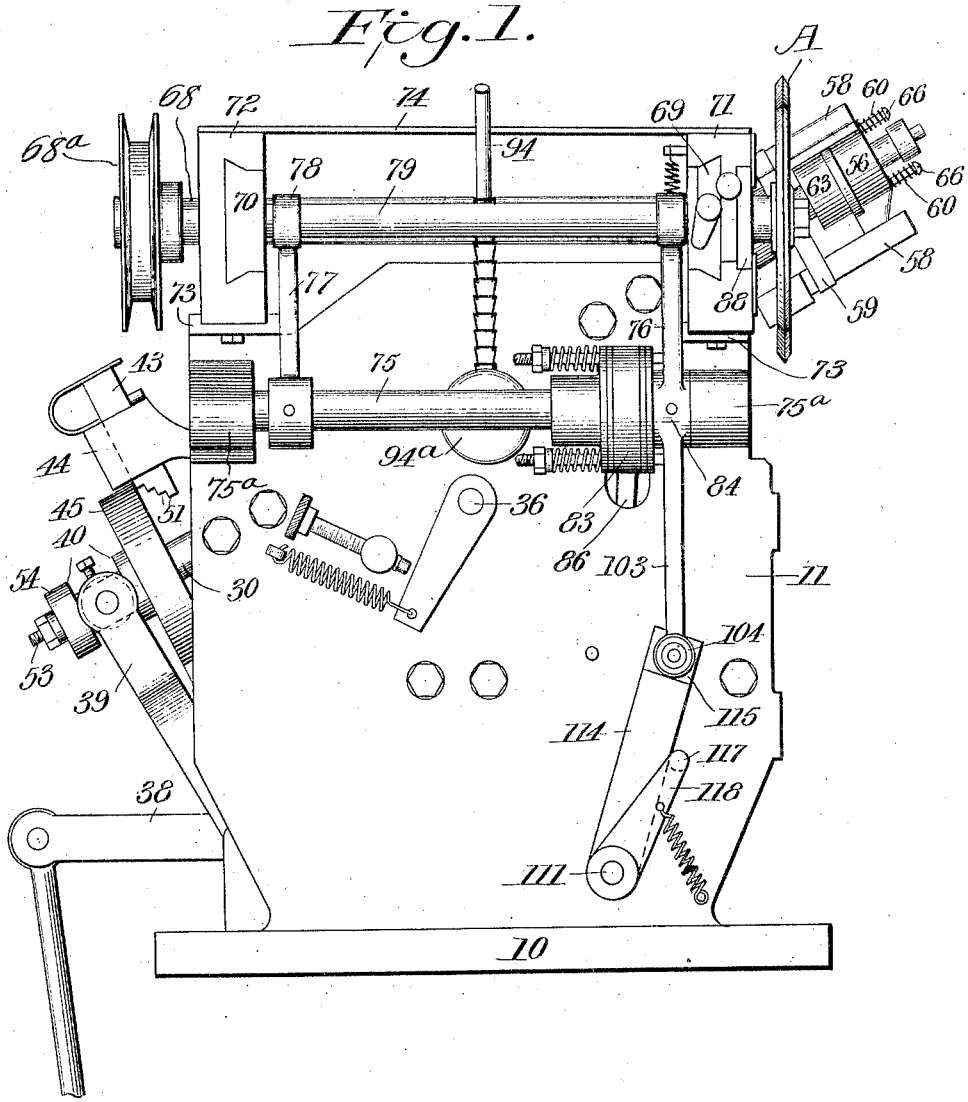
Fig. 1.
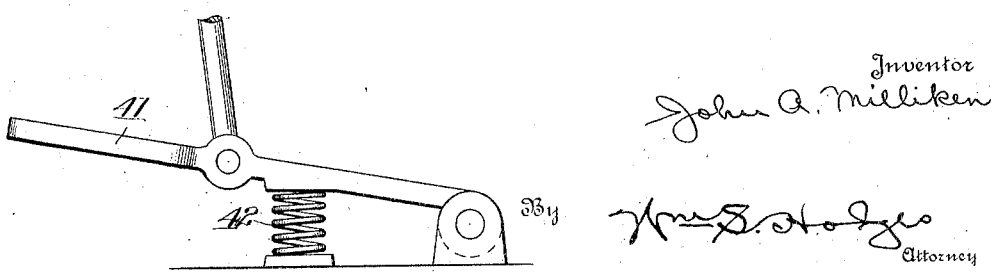
Inventor
John A. Milliken
By
Attorney

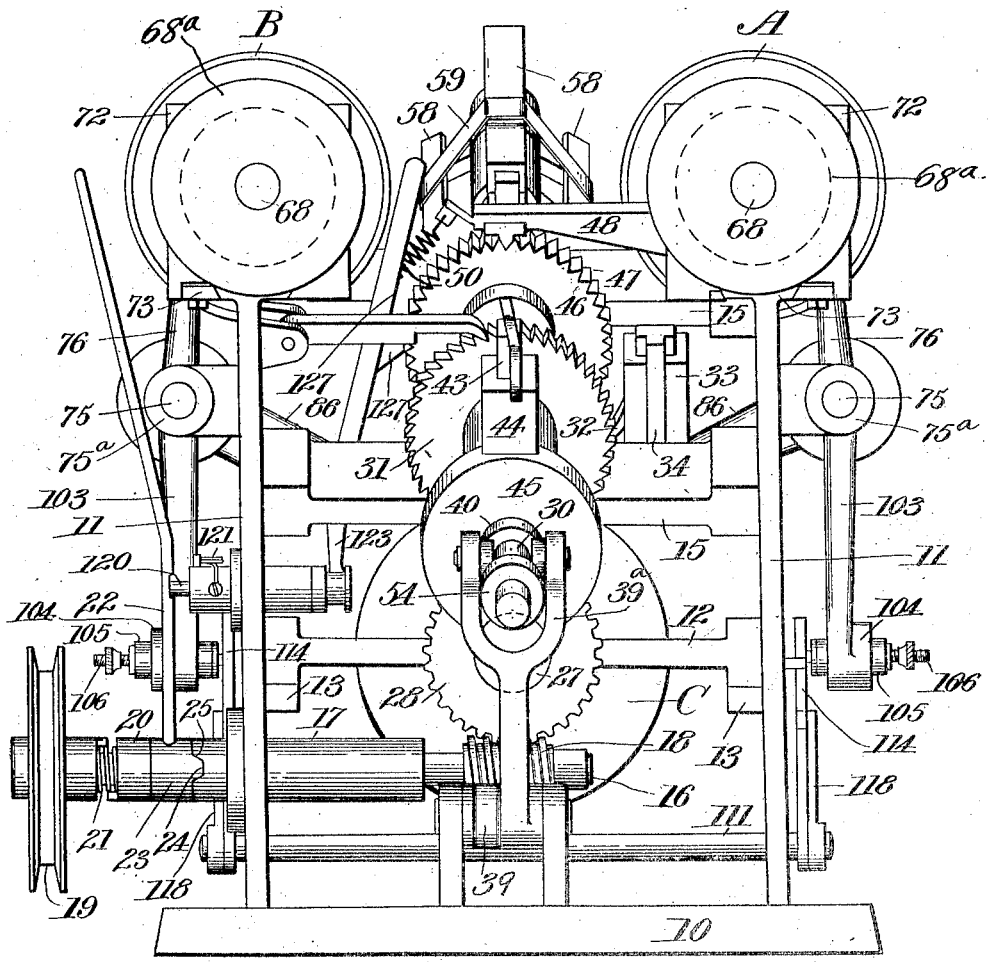

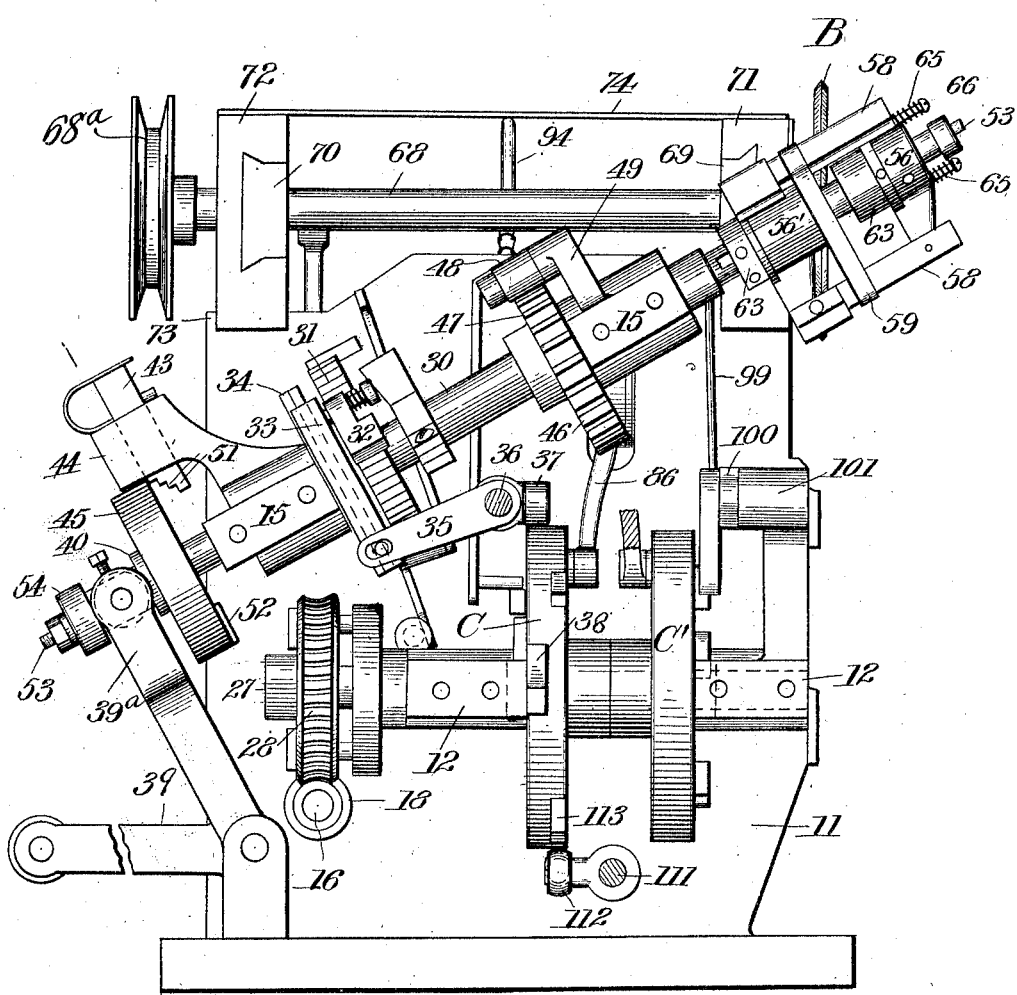

J. A. MILLIKEN.
GLASS CUTTING MACHINE.
APPLICATION FILED AUG. 21, 1916. RENEWED MAR. 25, 1921.
1,402,457.
Patented Jan. 3, 1922.
8 SHEETS—SHEET 5.
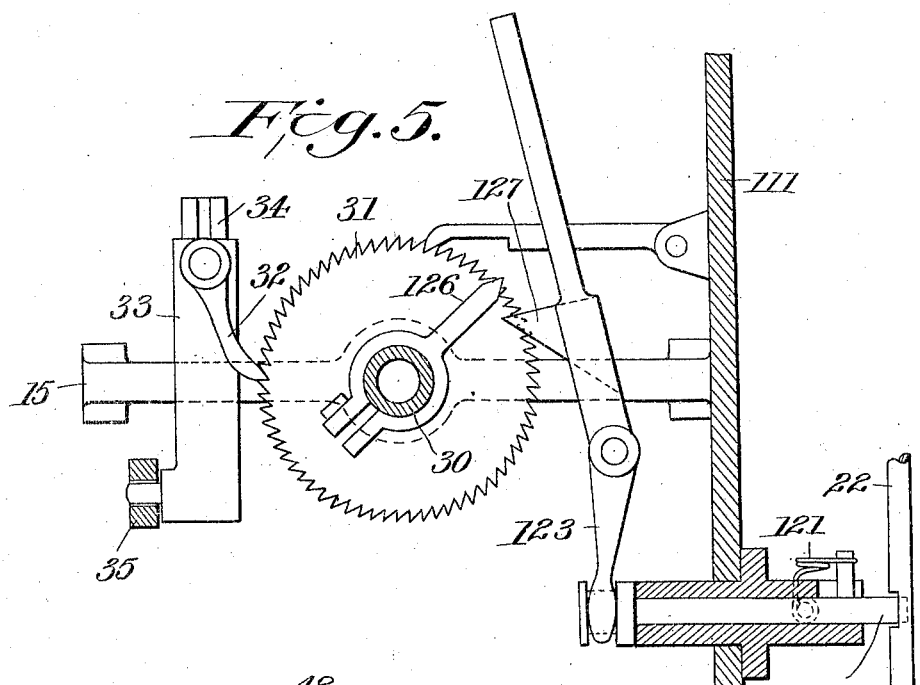
Fig. 5.
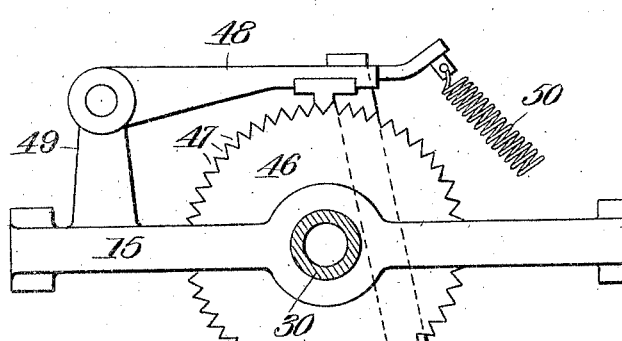
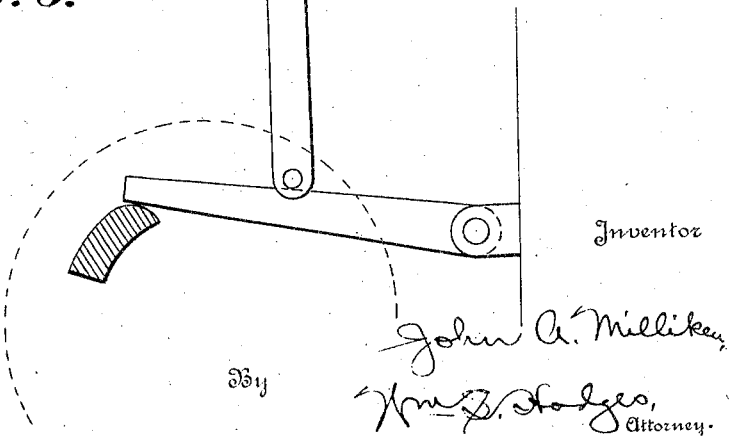
Fig. 6.

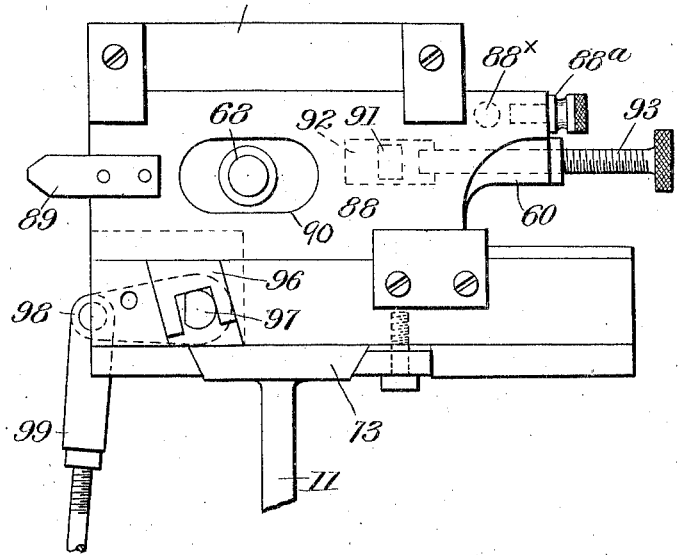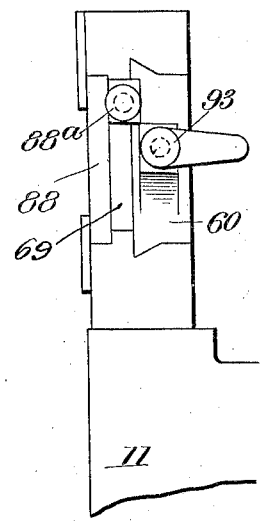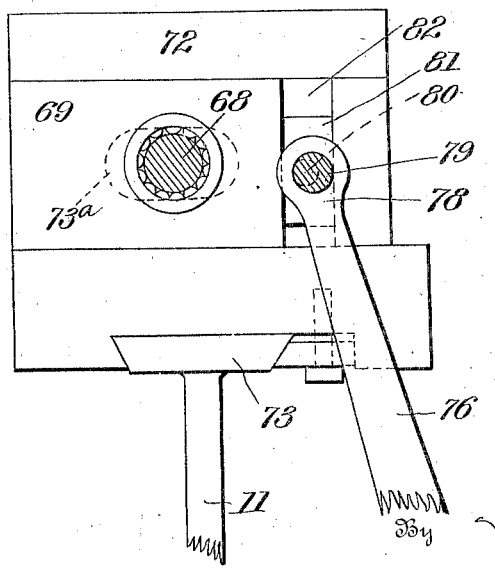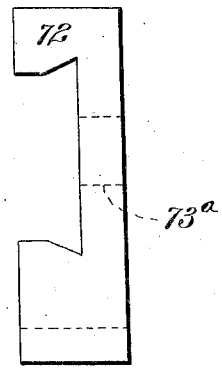

J. A. MILLIKEN.
GLASS CUTTING MACHINE.
APPLICATION FILED AUG. 21, 1916. RENEWED MAR. 25, 1921.

1,402,457. Patented Jan. 3, 1922.
8 SHEETS—SHEET 7.

Inventor
John A. Milliken,

By Wm. D. Hodges,
Attorney

J. A. MILLIKEN.
GLASS CUTTING MACHINE.
APPLICATION FILED AUG. 21, 1916. RENEWED MAR. 25, 1921.
1,402,457.
Patented Jan. 3, 1922.
8 SHEETS—SHEET 8.
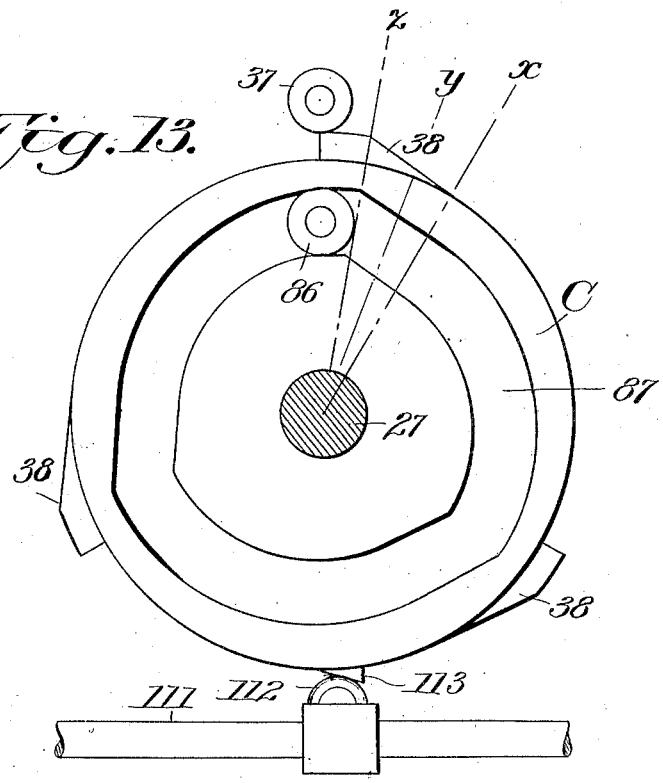
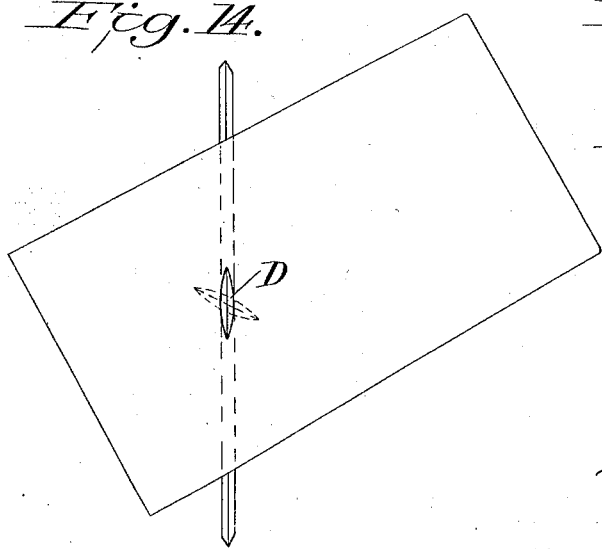

UNITED STATES PATENT OFFICE.

JOHN A. MILLIKEN, OF BAYONNE, NEW JERSEY, ASSIGNOR TO JOHN E. MARSDEN, OF ATLANTIC CITY, NEW JERSEY.

GLASS-CUTTING MACHINE.

1,402,457.     Specification of Letters Patent.     Patented Jan. 3, 1922.

Application filed August 21, 1916, Serial No. 116,170. Renewed March 25, 1921. Serial No. 455,593.

*To all whom it may concern:*

Be it known that I, JOHN A. MILLIKEN, a citizen of the United States, residing at Bayonne, in the county of Hudson and State of New Jersey, have invented new and useful Improvements in Glass-Cutting Machines, of which the following is a specification.

This invention is a machine for cutting or grinding ornamental designs into the surfaces of glass articles, such as tumblers and the like.

One of the objects of the invention is to provide a machine of this character for automatically applying a design to the surface of the article being acted upon. A further object is to provide means for automatically imparting a step by step rotation to the glass article, and for automatically applying a portion of the design during the pauses in the rotation thereof. A further object is to provide an automatic machine for ornamenting the surfaces of glass articles, said machine having means by which the design may be varied. A further object is to provide a machine of this character having means for controlling the cutting mechanism to automatically compensate for inequalities in the surface of the glass articles. A further object is to provide means to engage the glass article and mechanism controlled thereby, to insure a uniform depth of cut by the cutting mechanism. A further object is to provide means by which the depth of cut may be varied. A further object is to provide means whereby the machine will automatically adjust itself to glass bodies of different diameters, without previous manual manipulation. A further object is to provide means whereby the machine will be automatically stopped at the completion of the design that is being imparted to the article being operated upon.

The invention will be hereinafter fully set forth and particularly pointed out in the claims.

In the accompanying drawings:—

Figure 12:
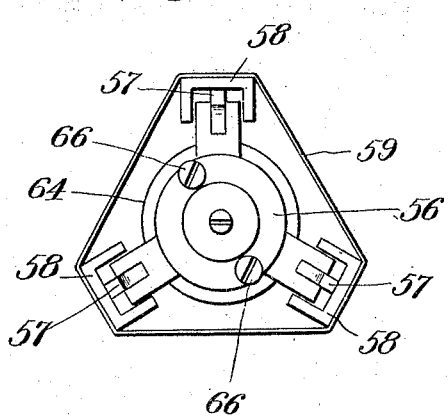

Figure 1 is a side elevation of a machine constructed in accordance with the invention. Figure 2 is a front view thereof. Figure 2ª is a detail view of the yieldable abutment. Figure 3 is a rear view of the machine. Figure 4 is a sectional side elevation, one of the sides of the machine frame being removed. Figure 5 is a detail view of the chuck-rotating and the throw-off mechanisms. Figure 6 is a detail view illustrating the means for preventing rotation of the chuck. Figures 7, 8, 9 and 10 are detail views of the feeler slide and grinder slides and their adjuncts. Figure 11 is a longitudinal sectional view of the chuck and chuck shaft. Figure 12 is a front end view of the chuck. Figure 13 is a detail view of the operating cam. Figures 14 to 17, are diagrammatic views illustrating the method of cutting and various designs produced thereby.

Referring to the drawings, 10 designates a base plate, attached to and supported by a suitable bench or standard (not shown). Secured to said base plate 10, are the sides 11, of the frame, said sides being rigidly retained in spaced relation, by pairs of cross bars. The lower cross-bars 12 rest upon ribs 13, formed on the inner faces of said sides, said cross bars being held in position in suitable manner. The upper cross bars 15, have their ends in engagement with the inner faces of the sides 11, said bars 15 being arranged in different planes.

The main drive shaft 16, is mounted in a sleeve-like bearing 17, extending transversely through one of the sides 11, a portion of said shaft being provided with a worm 18. Power may be applied to the shaft in any suitable or preferred manner. In the drawings, a pulley 19, is illustrated as loosely mounted upon said shaft, said pulley receiving its power from a source, not shown. Any desired form of clutch may be employed for coupling the pulley 19, with the drive-shaft. As shown in the drawings, the shaft is provided with a clutch member 20, rigidly secured thereto, complemental to a corresponding clutch member on one face of the pulley 19, a spring 21, encircling the shaft 16 acting against said pulley to normally separate the clutch members. For the purpose of moving the pulley against the tension of spring 21, to effect engagement of the clutch members, a lever 22 is provided, the same being attached to a hub 23, rotatably mounted upon the shaft 16, one end of said hub being positioned to abut against the hub of the pulley 19, the other end of the hub 23 being provided with a projection 24, shaped to enter a cam recess 25, formed in the contiguous end of the bearing sleeve 17. The spring 21, acts against the lever 22, to maintain the projection 24, opposite the recess 25, thereby permitting the spring 21, to move the pulley 19, in a direction to disengage the clutch. Mounted in suitable bearings with which the cross-bars 12 are provided, is a cam shaft 27, the same being provided with a worm wheel 28, meshing with the worm 18 on the main drive shaft.

The cross bars 15 are provided with bearings which rotatably support a normally inclined chuck-shaft 30, provided with a ratchet wheel 31, which is engaged by a pawl 32, pivotally mounted upon a pawl carrier 33, slidably mounted upon a guide 34, secured in suitable manner to one of the cross-bars 15. The pawl carrier 33, is reciprocated by means of an arm 35, to which it is pivotally connected, said arm being attached to a rock shaft 36, having its ends mounted in suitable bearings carried by the sides 11, said rock shaft being provided with an actuating finger 37, overhanging a cam member C secured to the cam shaft 27. Said cam member is provided with a plurality of raised peripheral cam portions 38, positioned to engage the finger 37, and thereby rock the shaft 36, so as to actuate the pawl member, whereby the chuck shaft receives a partial forward rotation. The chuck shaft 30, is slidable longitudinally in its bearings, movement being imparted thereto by means of a bell crank lever 39, one arm of which is provided with a fork 39ᵃ, engaging shoulder 40 formed on said shaft, the other arm of said bell crank lever being connected with a treadle 41. A spring 42, or other suitable device, is employed to press said chuck shaft upwardly against a spacing bar 43, supported in a suitable carrier 44, attached to one of the bars 15, said spacing bar being positioned to engage an annular flange 45 attached to the shaft 30, to limit longitudinal movement of said shaft in one direction, for a purpose to be hereinafter described. In order to lock the chuck shaft after each partial forward rotation thereof, under the action of pawl 32, a locking wheel 46 is rigidly secured thereto, the periphery of said wheel being provided with V-shaped notches 47 corresponding in number with the teeth upon ratchet wheel 31. Said notches are engaged by a locking member 48, provided with a projection complemental thereto, said locking member being pivotally supported by a projection 49, attached to one of the cross bars 15, a spring 50 acting to maintain said locking member normally in engagement with the periphery of the locking wheel.

The spacing bar 43 is provided with one or more shoulders 51, corresponding to the number of times the glass is to be completely rotated while the design is being applied thereto, said shoulders being positioned to be engaged by the flange 45. Attached to said flange 45 is a cam 52, which as the flange 45 completes each revolution, engages one of the shoulders of the spacing bar, and moves said bar upwardly a sufficient distance to bring the next shoulder into position opposite to said flange 45, the spring 42, on the treadle 41, serving to move the chuck shaft longitudinally to bring said collar into engagement with the said next shoulder.

Any desired form of chuck for engaging and holding the glasses to be operated upon, may be employed. In the form of chuck illustrated, the chuck shaft 30 is made hollow, and extending longitudinally through the same is a draw-bar 53, provided at its lower end with a collar 54, slidably mounted upon the chuck shaft, and held in engagement with the fork 39ᵃ, of the bell crank lever 39, by means of a spring 55, acting between abutments upon said draw bar and said chuck shaft respectively. Rigidly secured to the upper end of the chuck shaft 30, are hubs 56 and 56′ provided with pivoted fingers 57, which support glass engaging bars 58, of approximate U-shape in cross section, an elastic band 59 encircling the bars 58 acting to maintain them normally under compression and in contracted relation. Each finger 57 is provided with a rearwardly extended projection 60. The chuck shaft 30 is longitudinally slotted adjacent the hubs 56 and 56′, to accommodate pins 61 and 61′, attached to the draw bar 53. The pin 61 projects through a slotted portion 62, formed in a slidable hub 63, said hub being provided with a flange 64, normally held against the projection 60, of the contiguous fingers 57, by means of springs 65, encircling bolts, or similar devices 66, attached to said collar, and extended through lugs projecting from the hub 56. The pin 61′ rigidly connects a hub 63′ with the draw-bar 53, said hub 67 being provided with a flange 64′, positioned to engage the projections 60 of the fingers 57 carried by the hub 56′. By means of this arrangement the flanges 64 and 64′, acting against the projections 60, of the fingers 57 hold the bars 58, outwardly into engagement with the inner surface of the glass to be acted upon, and against the tension of the elastic band 59, until the treadle 41 is pushed downwardly drawing the drawbar 53 downwardly, with the result that the hub 63′ is positively moved at once with the draw-bar, permitting the fingers 57 carried by the hub 56′, to move inwardly under the tension of the band 59, and as the draw bar 53 continues to move, the pin 61 will traverse the length of the slot 62, and then withdraw the hub 63 from engagement with the fingers 57 carried by the hub 56 whereupon a glass upon the chuck may be removed and a new one substituted. The arrangement above described permits of the ready and prompt placing of the glass into, and removing it from position to be acted upon by the grinding devices to be hereinafter described, and at the same time insures that the glass will be firmly engaged at all points by a uniform pressure of sufficient force to retain the same in position and insure its rotation with the chuck during the operations of the machine.

In the drawings two grinding mechanisms A and B are disclosed, although either may be dispensed with without departing from the spirit of the invention. For most purposes, however, for which the invention is designed, two such mechanisms are desirable the same being actuated by cams C and C' secured to cam shaft 27. Inasmuch as each of the mechanisms is a duplicate of the other, the description of one will suffice. Each of said grinding members comprises a drive shaft 68 mounted in front and back slides 69 and 70, movably supported in housings 71 and 72, located at the front and back of the frame, respectively. Said housings are adjustably mounted upon guides 73, carried by the contiguous side 11 of the frame, being connected by a top-plate 74, whereby both housings may be simultaneously moved to adjust the shaft 68, forwardly or backwardly, as may be desired. The slides 69 and 70 are provided with antifriction bearings of any suitable or desired form, capable of rotatably supporting said shaft. The housings 71 and 72, are provided with longitudinally extended slots 73ª, to provide clearance for the lateral movement of the shaft when the slides 69 and 70 are actuated. A rock shaft 75 is supported by bearings 75ª, carried by the sides 11, and secured to said rock shaft are arms 76 and 77, which arms are provided with bearings 78, to support a second rock shaft 79, provided at its ends with crank members 80, engaging blocks 81 mounted in vertical guides 82, in the respective slides 69 and 70. Loosely mounted on the rock shaft 75 is one member 83, of a friction device, the other member 84 of which is connected with the arm 76. The member 83 of the friction device is secured to an arm 86 which engages a cam groove 87 in one face of the cam member C or C', as the case may be. The shaft 68 is rotated in suitable manner, belt pulleys 68ª for that purpose being illustrated in the drawings.

The front face of the housing 71 is provided with a guide for a feeler slide 88, provided with a projection 89 adapted to engage the glass being operated upon, for the purpose of controlling the movement of the slides 69 and 70, said slide 88 having a slot 90 to provide clearance for the shaft 68. The inner face of the feeler slide 88, is provided with a pin or lug 91 which projects into a recess 92, in the slide 69, the movement of the lug 91 relative to the slide 69, being adjustably limited by means of a screw 93, carried by the said slide 69, and supported opposite the pin or lug 91. When a glass is to be placed upon the chuck, the rock shaft 79 is manually actuated by means of the finger 94, so as to move the slides 69 and 70, and the feeler slide 88, away from the chuck. When the glass has been placed in position, movement of the rock shaft 79, is reversed until the projection 89, comes into contact with the glass, whereupon movement of all the slides is arrested. In order to temporarily lock the feeler slide 88, during the period that the chuck is not rotating, the housing 71 is provided with a guide to receive a locking member 96 loosely mounted upon an eccentric 97 provided with an operating arm 98, connected by a link 99, with an actuating member 100, pivotally supported in an arm 101 carried by one of the cross bars 12, and said actuating member being operatively connected with the cam C'. In operation after the feeler slide has been moved into engagement with the glass, the arms 76 and 77, are actuated to move the slides 71 and 72, toward the chuck, to bring the grinding wheels A and B, into contact with the glass, the contacting movement of each wheel being arrested when the screw 93, comes into contact with the pin or lug 91, movement of the feeler slide being prevented by the locking member 96. It will thus be observed that the feeler slide serves as a gage to control the movement of its respective grinding wheel with respect to the tumbler. In order to prevent shaft 79 from rocking too freely a tension device is provided, such as the weight 94ª. Movement of the feeler slide 88 away from the chuck is adjustably limited by a threaded rod 88ª mounted in slide 88 and positioned to engage a stop 88ˣ carried by slide 69.

In order to compensate for inequalities in the diameter of the glass being acted upon so as to insure uniformity in the operation of the grinding mechanism, the arm 76, is provided with an extension 103 provided at its extremity with a hub 104, carrying a sleeve 105, through which extends a pin 106. Said pin is encircled by a helical spring 107, one end of which acts against an abutment in the sleeve, and the other end acts against a collar 108 attached to the pin. Movement of the pin under the action of the spring is limited by the nut 109, movement in the other direction being limited by a flange 110 on the collar 108, positioned to abut against the end of the sleeve. Mounted in suitable bearings carried by the sides 11, is a rock shaft 111, provided with an actuating member 112, positioned to engage cam projections 113 on the cam member C. Loosely mounted on said rock shaft is a member 114, provided with a wedge-shaped portion 115, positioned to move between the inner end of the pin 106, and a pin or lug 116 projecting from the side 11, said member 114, resting by gravity against a pin or lug 117, carried by an arm 118 rigidly secured to said rock shaft. In operation, while the slides 69 and 70 are moving toward the glass to be operated upon, the arm 103 moves away from the side member 11, permitting the spring 107 to project pin 106 toward said side member, to move collar 110 away from the end of sleeve 105. At the same time the wedge portion 115 of member 114, is moving by gravity between pin 106 and lug 117. Just as soon as movement of the slides is arrested, the movement of wedge member 115 is also arrested, for the reason that the gravity cannot overcome the friction of the engagement with pin 106. The distance between collar 110 and the end of sleeve 105 at this time, corresponds to the distance the slides 69 and 70 have moved toward the glass. As said slides move away from the glass, the extension 103 is first moved the distance between collar 110 and the end of sleeve 105, whereupon the wedge 115, which fills the space between pin 106 and lug 116, acts as a solid abutment, co-operating with collar 110 to prevent further movement of said extension 103, and therefore also limiting the withdrawal movement of the slides, but the cam arm is permitted to continue to move, by the friction device. By this arrangement each grinding wheel is moved just far enough to clear the glass and permit the latter to be rotated, the grinding mechanism being then automatically held in a neutral position until the peak of the cam in member C or C', as the case may be, comes around into engagement with the cam arm 86 to repeat the operation of the machine. This operation will be more clearly understood by reference to Figure 13, in which the cam arm 86 is shown as having just reached the peak of the cam. In travelling to this position, when the roller reaches the point $x$, the feeler slide 88, is unlocked, and the grinding wheel starts to withdraw, the withdrawal being completed when the point $v$ is reached. The roller must then travel from $v$ to the peak of the cam, as indicated at $z$, further movement of the grinding wheel being prevented by the member 114 until the roller reaches the peak of the cam at which point the cam 113 engages actuating member 112, and actuates rock shaft 111 to withdraw the member 114, whereupon the operations of the machine are repeated. Thus it will be understood that the feeler slide 88, serves as a gage to automatically adjust the parts to compensate for irregularities in the surface of the glass being acted upon, and also to automatically compensate for glasses of different sizes.

In order to provide for the automatic stopping of the machine at the completion of the cutting operation, suitable throw off mechanism is provided. Said mechanism is illustrated as comprising a latch 120, slidably mounted in a boss attached to one of the sides 11, and normally held in the path of the clutch lever 22, by a spring 121. Said latch is shifted against the tension of the spring, by means of a lever 123, connected at one end to the latch, and pivotally supported in suitable manner, said lever having an extension by means of which it may be manually operated if desired. Adjustably attached to the chuck shaft 30 is a throw off pawl 126, movable with the chuck shaft when the latter is shifted longitudinally. At the end of the last revolution of the chuck shaft, i. e., that revolution which takes place while the flange 45, is in engagement with the last notch of the spacing bar 43, the throw-off pawl will have been moved into a position opposite the lever 123, and will engage a cam portion 127 on said lever, shifting the latter in a direction to withdraw the latch 120 from engagement with the clutch lever 22, permitting the pulley 19 to be automatically unclutched from the drive shaft.

In operation, the operator first presses down upon the treadle 41, thereby shifting the draw-bar 53, so as to contract the chuck, whereupon the glass may be placed over the chuck as shown at G in the drawing. Upon releasing the treadle, the chuck members will accurately and uniformly engage the glass with sufficient force to insure that the glass will rotate with the chuck. Both shafts 79 are rocked toward the glass by the fingers 94, thereby bringing the feeler slides 88 into engagement with the glass, and moving the grinding wheels also into engagement with the glass. The clutch lever 22 is then shifted to permit the pulley 19 to be clutched with the drive shaft 16, whereupon the cam shaft 27 is set in motion, the clutch lever being engaged by latch 102. As soon as the cam shaft starts to revolve, the actuating member 10 is operated to bring the locking blocks 96, into engagement with the feeler slides 88, to temporarily lock the latter rigidly against movement. Just as soon as the feeler slides 88 are locked, the cams C and C' rock the arms 86 to actuate the rock shafts 74 and 79, to carry the grinding wheels A and B into engagement with opposite sides of the glass, the feeding movement of the said grinding wheels being limited by the engagement of the adjustable abutments 93, engaging the pins 91, carried by the feeler slides 88. As soon as movement of the slides is arrested by the abutments 93, the cutting or grinding action of the grinding wheels A and B ceases, further movement of the cam arms 86, however, being permitted by the friction devices, in order to allow the cams to rotate to the points at which the withdrawal of the cutting devices is to commence. Simultaneously with the feeding movement of the grinding wheels A and B, the rock shaft 111, has been operated to permit the members 114, to drop between the pins 106 and the lugs 116, the distance between collar 110 and the end of sleeve 105 corresponding to the distance the slides have travelled toward the glass. When the cams C and C' have rotated to the point that the cam arms 86, are moved to withdraw the cutters, the member 100 is actuated to disengage the locking blocks 96 from the feeler slides 88, and the reverse movement of the rock shafts 74 moves the grinding wheels A and B away from the glass, a sufficient distance to permit the latter to be rotated with the chuck. By reason of the engagement between the pins 106, lugs 116, and the members 114, rigid abutments are provided which prevent the slides from moving back a distance greater than that required to permit of rotation of the glass. the friction devices permitting the cam members 86, to move until the peaks of the cams C and C' come around into engagement therewith. Just as soon as the slides are moved to disengage the cutters from the glass, the cam member C actuates the pawl carrier 33, so as to rotate the chuck shaft a predetermined distance. At the time that this rotation of the chuck shaft is completed, the peaks of the respective cam grooves in cams C and C' have reached the cam arms 86, and the slides 69 and 70, and the feeler slides 88, are again moved toward the glass until the feeler slides contact with the same, at which time said feeler slides are again locked, and the cutters brought up into engagement with the glass, in the manner before described, the feeding movement being limited by engagement with the feeler slide, as before described. These automatic operations of feeding up to and away from the glass, and the periodic rotation of the chuck shaft, continue until the chuck has completed a number of revolutions corresponding to the number of shoulders 51, on the spacer bar 43, the chuck being moved longitudinally step by step at the end of each complete rotation of the chuck shaft. As the rotation of the chuck shaft, in engagement with the last shoulder of the spacing bar is completed, the throw-off pawl 126, has been moved to a position opposite the throw-off lever 123, whereupon the latch 120, is withdrawn from engagement with the clutch lever 22, and the pulley 19, is automatically unclutched from the drive shaft. The treadle 41 is then depressed to contract the chuck, whereupon the glass may be withdrawn.

It will be understood that while the grinding mechanisms A and B, are illustrated and described as mounted on horizontal shafts, with an inclined chuck shaft between them, it is obvious that the chuck shaft may be mounted horizontally and the other shafts in parallel relation, inclined with respect to the chuck shaft without departing from the spirit of the invention. This angular relation of the grinders and of the chuck shaft possesses an important advantage. It will be readily seen that the grinders of the respective mechanisms A and B make cuts in the glass at an angle to each other, which angle will vary with the relative angle of the chuck and the axes of the grinders. When the cutters are adjusted so that they engage the glass in line with a point corresponding to the intersection of the axis of the chuck shaft, with the axes of the grinders, the cuts made by the cutters will intersect each other at the middle, as shown at D in Figure 14. By adjusting the mechanism A backwardly, and the mechanism B, forwardly in equal distance, the cuts may be made to intersect at various points or even to be slightly separated as indicated at E Figures 15 and 17, and by reversing this adjustment the cuts will have the reverse appearance as indicated at F in said Figure 16.

Having thus explained the nature of the invention, and described an operative manner of constructing and using the same, although without attempting to set forth all of the forms in which it may be made, or all of the forms of its use, the following is claimed:—

1. In a glass cutting mechanism of the character described comprising a chuck, a grinder, means for alternately moving the grinder into and out of engagement with an article to be operated upon, and a feeler member reciprocated to and from said article by corresponding movements of said grinder.

2. A glass cutting mechanism of the character described comprising a chuck, a grinder, means for alternately moving the grinder into and out of engagement with an article to be operated upon, a feeler member reciprocated to and from said article by corresponding movements of said grinder, and means cooperating with the grinder moving means by which the engaging movements of the grinder and feeler member may be variably arrested to conform to inequalities in the surface contour of the article.

3. A glass cutting mechanism of the character described comprising a chuck, a grinder, means for alternately moving the grinder into and out of engagement with an article to be operated upon, a feeler member reciprocated to and from said article by corresponding movements of said grinder, and means for locking the feeler member after it has been moved into engagement with the article.

4. An improvement in glass cutting mechanism comprising a chuck, a grinder, means for moving the girnder into and out of engagement with an article carried by said chuck, a feeler slide for contacting with an article carried by said chuck, whereby said slide may be variably positioned in accordance with the size of the article, a locking block, means for automatically actuating said block to cause the same to periodically engage said slide, and means whereby movement of the grinder toward said chuck is limited by said slide.

5. A glass cutting mechanism of the character described comprising a chuck, a grinder, means for alternately moving the grinder into and out of engagement with an article to be operated upon, a feeler member reciprocated to and from said article by corresponding movements of said grinder, means cooperating with the grinder moving means by which the engaging movements of the grinder and feeler member may be variably arrested to conform to inequalities in the surface contour of the article, whereby a uniform depth of cut is maintained irrespective of the surface inequalities, and means for adjustably varying the depth of the cut.

6. An improvement in glass cutting mechanism comprising a chuck, a grinder, means for moving the grinder into and out of engagement with an article carried by the chuck, a feeler slide movable relative to the chuck and positioned to contact with an article carried by said chuck, said grinder and said slide being normally free for relative movement, and means for periodically limiting the relative movement of said grinder and said slide.

7. A glass cutting mechanism of the character described comprising a chuck, a grinder, means for alternately moving the grinder into and out of engagement with an article to be operated upon, a feeler member reciprocated to and from said article by corresponding movements of the grinder, said feeler member and said grinder being connected to have relative movement at all times, and adjustable means for variably limiting said relative movement.

8 An improvement in glass cutting mechanism comprising a chuck, a grinder, cutter-carrying slides supporting the grinder and movable toward and from the chuck, a feeler slide for contacting with an article carried by said chuck, and movable relative to the grinder carrying slides, and means for limiting the relative movement of the grinder carrying slides and the feeler slide.

9. An improvement in glass cutting mechanism comprising a chuck, a grinder, slides supporting the grinder and movable toward and from the chuck, a feeler slide for contacting with an article carried by said chuck, and movable relative to the grinder carrying the slides, and means for adjustably varying the relative movement of the grinder carrying slides and the feeler slides.

10. An improvement in glass cutting mechanism comprising a chuck, a grinder, slides supporting the grinder and movable toward and from the chuck, a feeler slide for contacting with an article carried by said chuck, and movable relative to the grinder carrying slides, a lug projecting from one face of the feeler slide, and an abutment on one grinder slide positioned to engage said lug to limit relative movement of the grinder-carrying slides and the feeler slide.

11. An improvement in glass cutting mechanism comprising a chuck, a grinder, slides supporting the grinder and movable toward and from the chuck, a feeler slide for contacting with an article carried by said chuck, and movable relative to the grinder-carrying slides, a lug projecting from one face of the feeler slide, and a threaded rod carried by one grinder slide and positioned to engage said lug to adjustably limit relative movement of the grinder-carrying slides and the feeler slide.

12. An improvement in glass cutting mechanism comprising a chuck, a grinder, slides supporting the grinder and movable toward and from the chuck, a feeler slide for contacting with an article carried by said chuck, and movable relative to the grinder-carrying slides means for periodically locking the feeler slide, and means for limiting relative movement of the grinder-carrying slides and the feeler slides.

13. An improvement in glass cutting mechanism comprising a chuck, a grinder, slides supporting the grinder and movable toward and from the chuck, a feeler slide for contacting with an article carried by said chuck, and movable relative to the grinder-carrying slides, a locking block, means for causing said locking block to periodically engage said feeler slide, and means for limiting the relative movement of the grinder-carrying slides and the feeler slide.

14. An improvement in glass cutting mechanism comprising a chuck, a grinder, slides supporting the grinder and movable toward and from the chuck, a feeler slide for contacting with an article carried by said chuck, and movable relative to the grinder carrying slides, a locking block for said feeler slide, an eccentric for actuating said locking block, and means for limiting relative movement of the grinder-carrying slides and the feeler slide.

15. An improvement in glass cutting mechanism comprising a chuck, a grinder, slides supporting the grinder and movable toward and from the chuck, a feeler slide for contacting with an article carried by said chuck, and movable relative to the grinder-carrying slide, a locking block for said feeler slide, an eccentric engaging said locking block to actuate the same, an actuator for said eccentric, a cam for periodically operating said actuator, and means for limiting relative movement of the grinder-carrying slides and the feeler slides.

16. An improvement in glass cutting mechanism comprising a chuck, a grinder, means for moving the grinder into and out of engagement with an article carried by said chuck, a feeler slide for contacting with an article carried by said chuck, whereby said slide may be variably positioned in accordance with the size of said article, means whereby movement of the grinder toward said chuck is limited by said slide, and means for limiting movement of the feeler slide away from said chuck.

17. An improvement in glass cutting mechanism comprising a chuck, a grinder, means for moving the cutter into and out of engagement with an article carried by said chuck, a feeler slide for contacting with an article carried by said chuck, whereby said slide may be variably positioned in accordance with the size of said article, means whereby movement of the grinder toward said chuck is limited by said slide, and an adjustable abutment for variably limiting movement of the feeler slide away from said chuck.

18. An improvement in glass cutting mechanism comprising a chuck, a rock shaft, grinding mechanism connected with the rock shaft and movable thereby toward and from the chuck, means for actuating the rock shaft, and means positioned to contact with the article and controlled by the variations in the surface inequalities of the article carried by said chuck to variably limit successive movements of the grinding mechanism toward said chuck.

19. An improvement in glass cutting mechanism comprising a chuck, a rock shaft having a predetermined arc of oscillation, grinding mechanism connected with the rock shaft and movable thereby toward and from said chuck, means for actuating the rock shaft, means controlled by the size of the article carried by said chuck to limit movement of the grinding mechanism toward the chuck, and relief means for permitting the rock shaft to complete its arc of oscillation when movement of the grinding mechanism toward the chuck is arrested.

20. An improvement in glass cutting mechanism comprising a chuck, a rock shaft, grinding mechanism, arms carried by said rock shaft, a second rock shaft in said arms, means connecting said second rock shaft with respect to the grinding mechanism to permit independent movement of the grinding mechanism with respect to the chuck, and means positioned to contact with the article and controlled by the variations in the surface inequalities of the article carried by said chuck to limit movement of the grinding mechanism toward the chuck.

21. An improvement in glass cutting mechanism comprising a chuck, a rock shaft, grinding mechanism, arms carried by said rock shaft, a second rock shaft carried by said arms, means connecting said second rock shaft with the grinding mechanism to permit independent movement of the grinding mechanism with respect to the chuck, means whereby said second rock shaft may be manually actuated, and means controlled by the size of the article carried by said chuck to limit movement of the grinding mechanism toward the chuck.

22. An improvement in glass cutting mechanism comprising a chuck, a rock shaft, grinder carrying slides, arms carried by said rock shaft, a second rock shaft mounted in said arms, slidable blocks in said slides connected with the second rock shaft, and means controlled by the size of the article carried by the chuck to limit movement of the grinder-carrying slides toward the chuck.

23. An improvement in glass cutting mechanism comprising a chuck, a rock shaft, grinding mechanism connected with the rock shaft and movable thereby toward and from the chuck, a rotatable cam, an arm connected with the rock shaft and engaging said cam, and means controlled by the size of the article carried by said chuck to limit movement of the grinding mechanism toward said chuck.

24. An improvement in glass cutting mechanism comprising a chuck, a rock shaft, grinding mechanism connected with the rock shaft and movable thereby toward and from the chuck, a rotatable cam, an arm connected with the rock shaft and engaging said cam, means controlled by the size of the article on said chuck for limiting movement of the grinding mechanism toward the chuck, and relief mechanism for permitting said arm to move with said cam after movement of the grinding mechanism toward the chuck is arrested.

25. An improvement in glass cutting mechanism comprising a chuck, a rock shaft, grinding mechanism connected with the rock shaft and movable thereby toward and from the chuck, a rotatable cam, an arm connected with the rock shaft and engaging said cam, means controlled by the size of the article on said chuck for limiting movement of the grinding mechanism toward the chuck, and a friction device connecting said arm with said rock shaft to permit said arm to move with the cam after movement of the grinding mechanism toward the chuck is arrested.

26. An improvement in glass cutting mechanism comprising a chuck, a rock shaft, grinding mechanism connected with the rock shaft and movable thereby toward and from the chuck, a cam arm engaging said cam and provided with a friction member, a complemental friction member carried by said rock shaft, and means controlled by the size of the article on said chuck for limiting movement of the grinding mechanism toward the chuck.

27. An improvement in glass cutting mechanism comprising a chuck, a grinder, means for moving the grinder into and out of engagement with an article carried by the chuck, means controlled by variations in the dimensions of said article for limiting movement of the grinder toward the chuck, and means for preventing the grinder from moving away from the chuck a distance greater than the distance traversed by it when moving toward the chuck.

28. An improvement in glass cutting mechanism comprising a chuck, a grinder, means for moving the grinder into and out of engagement with an article carried by said chuck, a feeler slide for contacting with an article carried by said chuck, whereby said slide may be variably positioned in accordance with the size of the article, means whereby movement of the grinder toward said chuck is limited by said slide, and means for preventing the grinder from moving away from the chuck a distance greater than the distance traversed by it when moving toward the chuck.

29. An improvement in glass cutting mechanism comprising a chuck, a grinder, means for moving the grinder toward and from the work, means for variably limiting movement of the grinder toward the work in accordance with inequalities in the surface of the work, and means for preventing the grinder from moving away from the work a distance greater than the distance traversed by it when moving toward the chuck in making each individual cut.

30. An improvement in glass cutting mechanism comprising a chuck, a grinder, a rock shaft connected with the grinder to move the same into and out of engagement with an article carried by the chuck, means for periodically actuating said rock shaft, means for variably limiting movement of the grinder toward said chuck in accordance with inequalities in the size of said article, and means for preventing the grinder from moving away from the chuck a distance greater than the distance traversed by it when moving toward the chuck in making each individual cut.

31. An improvement in glass cutting mechanism comprising a chuck, a grinder, a rock shaft connected with the grinder and having a predetermined arc of oscillation to move the grinder toward and from the chuck, means for variably limiting movement of the grinder toward the chuck in accordance with inequalities in the article carried by said chuck, means for preventing the grinder from moving away from the chuck a distance greater than the distance traversed by it when moving toward the chuck, and relief means for permitting the rock shaft to complete its arc of oscillation when movement of the grinder away from the chuck is arrested.

32. An improvement in glass cutting mechanism comprising a chuck, a grinder, a rock shaft connected with the grinder to move the same toward and from the chuck, means for periodically actuating said rock shaft, means for variably limiting movement of the grinder toward said chuck in accordance with inequalities in the size of an article carried by said chuck, an arm attached to said rock shaft, and means cooperating with said arm to limit movement of the grinder away from said chuck.

33. An improvement in glass cutting mechanism comprising a chuck, a grinder, a rock shaft connected with the grinder to move the same toward and from the chuck, means for periodically actuating said rock shaft, means for variably limiting movement of the grinder toward said chuck in accordance with inequalities in the size of an article carried by said chuck, an arm connected with said rock shaft, and a variable abutment positioned to cooperate with said arm to limit movement of the grinder away from said chuck.

34. An improvement in glass cutting mechanism comprising a chuck, a grinder, a rock shaft connected with the grinder to move the same toward and from the chuck, means for periodically actuating said rock shaft, means for variably limiting movement of the grinder toward said chuck in accordance with inequalities in the size of an article carried by said chuck, an arm connected with said rock shaft, and provided with a variable abutment, and a wedge-shaped abutment positioned to cooperate with said variable abutment to variably limit movement of the grinder away from said chuck.

35. An improvement in glass cutting mechanism comprising a chuck, a grinder, a rock shaft connected with the grinder to move the same toward and from the chuck, means for periodically actuating said rock shaft, means for variably limiting movement of the grinder toward said chuck in accordance with inequalities in the size of an article carried by said chuck, an arm connected with said rock shaft and provided with a variable abutment, a pivoted member having a wedge-shaped abutment positioned to cooperate with said variable abutment to variably limit movement of the grinder away from said chuck, and means for controlling movement of said abutment.

36. An improvement in glass cutting mechanism comprising a chuck, a grinder, a rock shaft connected with the grinder to move the same toward and from the chuck, means for periodically actuating said rock shaft, means for variably limiting movement of the grinder toward said chuck in accordance with inequalities in the size of an article carried by the chuck, an arm connected with said rock shaft, a wedge-shaped abutment, and means whereby said abutment automatically moves transversely of said arm as the arm moves with the rock shaft during movement of the grinder toward said chuck.

37. An improvement in glass cutting mechanism comprising a chuck, a grinder, a rock shaft connected with the grinder to move the same toward and from the chuck, means for periodically actuating said rock shaft, means for variably limiting movement of the grinder toward said chuck in accordance with inequalities in the size of an article carried by the chuck, an arm carried by the rock shaft, and a pivotally supported wedge-shaped abutment positioned to move by gravity transversely of said arm as the arm moves with the rock shaft during movement of the grinder toward said chuck.

38. An improvement in glass cutting mechanism comprising a chuck, a grinder, a rock shaft connected with the cutter to move the same toward and from the chuck, means for periodically actuating said rock shaft, means for variably limiting movement of the grinder toward said chuck in accordance with inequalities in the size of an article carried by the chuck, an arm connected with the rock shaft, a pivotally supported wedge-shaped abutment positioned to move by gravity transversely of said arm as the arm moves with the rock shaft during movement of the grinder toward said chuck, and an actuator for reversing movement of said abutment.

39. An improvement in glass cutting mechanism comprising a chuck, a grinder, means for moving the grinder toward and from the chuck, means for variably limiting movement of the grinder toward said chuck in accordance with inequalities in the size of an article carried by said chuck, and a variable abutment for preventing the grinder from moving away from the chuck a distance greater than the distance traversed by it when moving toward the chuck.

40. An improvement in glass cutting mechanism comprising a chuck, a grinder, means for moving the grinder toward and from the chuck, means for variably limiting movement of the grinder toward said chuck in accordance with inequalities in the size of an article carried by the chuck, a wedge-shaped abutment, means cooperating with said abutment for preventing the grinder from moving away from the chuck a distance greater than the distance traversed by it when moving toward the chuck, and means for controlling movement of said abutment.

41. An improvement in glass cutting mechanism comprising a chuck, a grinder, means for moving the grinder toward and from the chuck, means for variably limiting movement of the grinder toward said chuck in accordance with inequalities in the size of an article carried by the chuck, a gravity operated variable abutment, means co-operating with said abutment for preventing the grinder from moving away from the chuck a distance greater than the distance traversed by it when moving toward the chuck, and an actuator for periodically positioning said abutment.

42. An improvement in glass cutting mechanism comprising a chuck, a grinder, a rock shaft connected with the grinder and having a predetermined arc of oscillation to move the grinder toward and from the chuck, means for variably limiting movement of the grinder toward the chuck in accordance with inequalities in the article carried by the chuck, an arm for operating said rock shaft, means cooperating with said arm to prevent the grinder from moving away from the chuck a distance greater than the distance traversed by it when moving toward the chuck, and means for effecting a variable engagement between said arm and said rock shaft.

43. An improvement in glass cutting mechanism comprising a chuck, a grinder, a rock shaft connected with the grinder and having a predetermined arc of oscillation to move the grinder toward and from the chuck, means for variably limiting movement of the grinder toward the chuck in accordance with inequalities in the article carried by said chuck, an arm for operating said rock shaft, means cooperating with said arm to prevent the grinder from moving away from the chuck a distance greater than the distance traversed by it when moving toward the chuck, and complemental friction devices connecting said arm and said rock shaft.

44. An improvement in glass cutting mechanism comprising a chuck, a grinder, a rock shaft, an arm having a frictional engagement with said rock shaft and connected with said grinder, said grinder being movable toward and from the chuck, means for variably limiting movement of the grinder toward the chuck in accordance with inequalities in the article carried by said chuck, an extension for said arm, and means cooperating with said extension to prevent the grinder from moving away from the chuck a distance greater than the distance traversed by it when moving toward the chuck.

45. An improvement in glass cutting mechanism comprising a chuck, a grinder, an arm for moving said grinder toward and from said chuck, said arm having an extension, means for variably limiting movement, of the grinder toward the chuck in accordance with inequalities in the article carried by said chuck, mean cooperating with said extension to prevent the grinder from moving from the chuck a distance greater than the distance traversed by it when moving toward the chuck, and means for periodically actuating said arm.

46. An improvement in glass cutting mechanism comprising a chuck, a grinder, a cam, a cam arm engaging said cam, a relief connection between the cam arm and the grinder, means for variably limiting movement of the grinder toward the chuck in accordance with inequalities in the article carried by the chuck, and means for preventing the grinder from moving away from the chuck a distance greater than the distance traversed by it when moving toward the chuck.

47. An improvement in glass cutting mechanism comprising a chuck, a grinder, means for moving the grinder toward and from the chuck, an arm connected with the grinder-moving means, means for variably limiting movement of the grinder toward the chuck in accordance with inequalities in the size of an article carried by the chuck, a yieldable abutment carried by said arm, and means for engaging said abutment to limit movement of the grinder away from said chuck.

48. An improvement in glass cutting mechanism comprising a chuck, a grinder, means for moving the grinder toward and from the chuck, an arm connected with the grinder-moving means, means for variably limiting movement of the grinder toward the chuck in accordance with inequalities in the size of an article carried by the chuck, a yieldable abutment carried by said arm, and a variable abutment positioned to engage said yieldable abutment to limit movement of the grinder away from said chuck.

49. An improvement in glass cutting mechanism comprising a chuck, a grinder, means for moving the grinder toward and from the chuck, an arm connected with the grinder-moving means, means for variably limiting movement of the grinder toward the chuck in accordance with inequalities in the size of an article carried by the chuck, a yieldable abutment carried by said arm, a pivoted member having a wedge-shaped abutment positioned to engage said yieldable abutment to variably limit movement of the grinder away from the chuck, and means for controlling movement of said wedge-shaped abutment.

50. An improvement in glass cutting mechanism comprising a chuck, a grinder, means for moving the grinder toward and from the chuck, an arm connected with the grinder-moving means, means for variably limiting movement of the grinder toward the chuck in accordance with inequalities in the size of an article carried by the chuck, a yieldable abutment carried by said arm, and a pivotally supported wedge-shaped abutment positioned to move by gravity transversely of said yieldable abutment during movement of the grinder toward said chuck.

51. An improvement in glass cutting mechanism comprising a chuck, a grinder, means for moving the grinder toward and from the chuck, an arm connected with the grinder-moving means, means for variably limiting movement of the grinder toward the chuck in accordance with inequalities in the size of an article carried by the chuck, a yieldable abutment carried by said arm, a pivotally supported wedge-shaped abutment positioned to move by gravity transversely of said arm as the grinder moves toward said chuck, and an actuator for reversing the movement of said wedge-shaped abutment.

52. An improvement in glass cutting mechanism comprising a chuck, a grinder, means for moving the grinder toward and from the chuck, an arm connected with the grinder moving means, means for variably limiting movement of the grinder toward the chuck in accordance with inequalities in the size of an article carried by the chuck, a spring pressed pin mounted in said arm and having abutment shoulders, and means for variably engaging said pin to limit movement of the grinder away from said chuck.

53. An improvement in glass cutting mechanism comprising a chuck, a grinder, means for moving the grinder into and out of engagement with an article carried by the chuck, means for rotating the chuck, and pattern controlled means for imparting a longitudinal movement to said chuck.

54. An improvement in glass cutting mechanism comprising a rotatable chuck, a grinder, means for moving the grinder into and out of engagement with an article carried by the chuck, means normally acting to impart longitudinal movement to the chuck, and pattern means for regulating said longitudinal movement.

55. An improvement in glass cutting mechanism comprising a spring pressed chuck shaft having a flange, a cutter, means for moving the cutter into and out of engagement with an article supported by said chuck shaft, pattern means engaging said flange to limit movement of said shaft under the action of its spring, and automatic means for disengaging said pattern means from said flange.

56. An improvement in glass cutting mechanism comprising a rotatable chuck, a grinder, means for moving the grinder into and out of engagement with an article carried by the chuck, means normally acting to impart longitudinal movement to the chuck, a pattern member controlling said longitudinal movement, and means for automatically adjusting said pattern member to permit limited longitudinal movement of said chuck.

57. An improvement in glass cutting mechanism comprising a rotatable chuck provided with a flange, a grinder, means for moving the grinder into and out of engagement with an article carried by the chuck, means normally acting to impart longitudinal movement to the chuck, a pattern member engaging said flange to limit said longitudinal movement, and means for automatically adjusting said pattern member to permit limited longitudinal movement of said chuck.

58. An improvement in glass cutting mechanism comprising a rotatable chuck provided with a flange, a grinder, means for moving the grinder into and out of engagement with an article carried by the chuck, means normally acting to impart longitudinal movement to said chuck, a yieldable pattern member engaging said flange to limit said longitudinal movement, and a cam on said flange for periodically adjusting said pattern member to permit limited longitudinal movement of said chuck.

59. An improvement in glass cutting mechanism comprising a rotatable chuck, a grinder, means for moving the grinder into and out of engagement with an article carried by the chuck, a flange connected with said chuck, means normally acting to impart longitudinal movement to said chuck, a pattern member provided with a plurality of shoulders positioned to engage said flange to limit said longitudinal movement, and means for periodically moving the pattern member to permit said flange to successively engage said shoulders.

60. An improvement in glass cutting mechanism comprising a rotatable chuck, a grinder, means for moving the grinder into and out of engagement with an article carried by the chuck, and means controlled by the chuck for automatically stopping the machine when the chuck has made a predetermined number of revolutions.

61. An improvement in glass cutting mechanism comprising a rotatable chuck, a grinder, means for moving the grinder into and out of engagement with an article carried by the chuck, pattern means controlling the operation of the chuck, and means for automatically stopping the machine when the pattern on said article has been completed.

62. An improvement in glass cutting mechanism comprising a rotatable chuck, a grinder, means for moving the grinder into and out of engagement with an article carried by the chuck, a flange connected with said chuck, means normally acting to impart longitudinal movement to the chuck, a pattern member provided with a plurality of shoulders positioned to engage said flange to limit said longitudinal movement, means for periodically moving the pattern member to permit said flange to successively engage said shoulders, and means for automatically stopping the machine at the end of one complete revolution after the flange is engaged with the last shoulder.

63. An improvement in glass cutting mechanism comprising a drive shaft, a rotatable chuck, means operated by said drive shaft for actuating said chuck, means normally acting to impart longitudinal movement to the chuck, a throw-off member controlling the application of power to said drive shaft, and a throw-off pawl connected with the chuck and normally out of register with said throw-off member, said pawl being positioned to be brought into engagement with the throw-off member as the chuck moves longitudinally.

64. An improvement in glass cutting mechanism comprising spaced apart grinders mounted on parallel axes, and a chuck positioned between said cutters, on an axis extending in the same general direction, the axis of the chuck being at an angle with respect to the axes of the grinders.

65. An improvement in glass cutting mechanism comprising spaced apart grinders mounted on parallel horizontal axes, and a chuck located between the grinders and mounted on an inclined axis extending in the same general direction.

66. An improvement in glass cutting mechanism comprising spaced apart grinders mounted on parallel axes, a chuck positioned between said grinders, the axis of the chuck being at an angle with respect to the axes of the grinders, and means whereby the grinders may be adjusted in lines parallel with their axes.

67. An improvement in glass cutting mechanism comprising a frame, spaced apart grinder slides, grinders in said slides mounted on parallel axes, a chuck between grinders, means for moving the grinder an angle with respect to the axes of the grinders, means for moving the grinder slides toward and from the chuck, and means whereby the grinder slides may be adjusted forward and rearwardly on said frame.

68. An improvement in glass cutting mechanism comprising a frame, spaced apart boxes, spaced apart grinders mounted in said boxes on parallel axes, a chuck between the grinders, the axis of the chuck being at an angle with respect to the axes of the grinders, and means whereby said boxes may be adjusted forwardly and rearwardly in said frame.

In testimony whereof I have hereunto set my hand.

JOHN A. MILLIKEN.